75/85 03 4,603,943

United States Patent [19]

Okoshi

[11] Patent Number: 4,603,943

[45] Date of Patent: Aug. 5, 1986

[54] STRUCTURE OF AN OPTICAL FIBER

[75] Inventor: Takanori Okoshi, Tokyo, Japan

[73] Assignee: Sumitomo Electric Industries, Ltd., Osaka, Japan

[21] Appl. No.: 511,356

[22] Filed: Jul. 6, 1983

[30] Foreign Application Priority Data

Jul. 6, 1982 [JP] Japan ............ 57-117408

[51] Int. Cl.⁴ ............ G02B 6/10; G02B 6/16

[52] U.S. Cl. ............ 350/96.30; 350/96.29

[58] Field of Search ............ 350/96.29, 96.30, 96.32, 350/96.33

[56] References Cited

U.S. PATENT DOCUMENTS 3,980,390 9/1976 Yamamoto et al. ............ 350/96.33
4,046,537 9/1977 Deserno et al. ............ 350/96.30
4,179,189 12/1979 Kaminow et al. ............ 350/96.33
4,315,666 2/1982 Hicks, Jr. ............ 350/96.33
4,415,230 11/1983 Keck ............ 350/96.33

FOREIGN PATENT DOCUMENTS 0012845 1/1977 Japan ............ 350/96.33
0160252 12/1979 Japan ............ 350/96.30
0147109 11/1981 Japan ............ 350/96.30
2045458 10/1980 United Kingdom ............ 350/96.33

OTHER PUBLICATIONS

Polarization Characteristics of Noncircular Core Single-Mode Fibers Ramaswamy et al., Applied Optics/vol. 17, No. 18/Sep. 15, 1978.

Optical Propogation in W-Fiberguides with Rectangular Core, Applied Optics, vol. 18, No. 17/Sep. 1, 1979.

*Primary Examiner*—William L. Sikes
*Assistant Examiner*—Akm E. Ullah
*Attorney, Agent, or Firm*—Sughrue, Mion, Zinn, Macpeak, and Seas

[57] ABSTRACT

An improved structure of an optical fiber having a core positioned in the center and a surrounding cladding with a lower refractive index than the core is disclosed. A tunnel extending in the axial direction of the optical fiber is provided in two diametrically opposite portions of the core-cladding interface. This fiber permits a single-polarized light to be transmitted only in a single mode.

3 Claims, 12 Drawing Figures 1
2
4
1

STRUCTURE OF AN OPTICAL FIBER

FIELD OF THE INVENTION

The present invention relates to the structure of an optical fiber for use in single mode transmission, and more particularly, to an optical fiber suitable for use in communication systems.

BACKGROUND OF THE INVENTION

For communication purposes, a single mode optical fiber that allows light transmission only in the dominant ($HE_{11}$) mode is ideal. To produce this ideal fiber, the following relation must be satisfied:

$$2.405 > \frac{2a}{\lambda} \cdot \pi \sqrt{n_1^2 - n_2^2}$$

wherein $n_1$=the refractive index of the core, a=the core radius, $n_2$=the refractive index of the cladding, $\lambda$=the wavelength of the propagating light, $\pi$=the ratio of the circumference of a circle to its diameter. The resulting fiber with the core designed to have a small diameter so as to meet this relation is called a single mode fiber and, because of the absence of pulse delay due to multimode dispersion, has great potential for use as a future high-capacity communication channel.

However, the actual "single mode fiber" has two modes, $HE_{11}^{(V)}$ mode with an electric field in the vertical direction, and $HE_{11}^{(H)}$ mode with a field in the horizontal direction. Furthermore, the distribution of refractive indices in a cross section is not completely coaxial (symmetric with respect to the fiber axis) but more often than not, the distribution is elliptic or draws other forms which are asymmetric with respect to the fiber axis. Because of the difference in group velocity between the two $HE_{11}$ modes, pulse spread occurs at the receiving end as in the case of multimode dispersion, and this is believed to be one of the principal factors that put a limit on the transmission capacity of single mode fibers. This difference in group velocity would cause no problem if only one $HE_{11}$ mode, say, its vertical mode were, excited at the transmission end and propagated down through the fiber and then, that vertical mode alone were detected at the receiving end. However, with most common single mode fibers having an axially symmetrical form, it is very rare that the front of a polarized wave in $HE_{11}$ mode reaches the receiving end intact without being affected by the heterogeneity of the internal structure or fiber deformation.

Scientists have reported many methods for producing a single mode fiber that permits the front of a polarized wave to propagate through the fiber without being upset by possible deformations such as bending and torsion to which the fiber is usually subjected. According to one method, a stress providing an axially asymmetric distribution of refractive indices is applied to the interior of the fiber so that a small difference is given between the indices of refraction in two planes perpendicular to each other in the longitudinal direction of the fiber, and by so doing, a difference in phase velocity is provided between the two polarized wave components crossing at right angles and the degree of their coupling is reduced. In a refined version of this method, the core is shaped into an elliptic form or other geometries that are completely asymmetric with respect to the fiber axis, and by so doing, a difference in phase velocity is provided between two polarized wave components, one polarized in the direction of the major axis and the other being polarized in the direction of the minor axis and the degree of their coupling is also decreased. As is well known, the magnitude of coupling between two polarized components which cross at right angles is generally proportional to $C/(\Delta\beta/\beta_{av.})$ wherein C is the coefficient of coupling of the two components per unit transmission length of the fiber (C depends on the bending or torsion accompanying fiber deformations or the degree of unevenness of the internal structure of the fiber); $\beta$ is the difference between the phase constants of the two components; and $\beta_{av.}$ is the average of the two phase constants.

The essence of the two conventional methods described above is to achieve a transmission mode which is the closest to single polarization by means of providing a difference in phase velocity between two polarized components which cross with each other at right angles. However, the fact remains that both polarized waves have a transmissible mode. So, if the coupling coefficient C is great, that is, if the fiber is subjected to great deformation or if it is very long, the magnitude of the coupling between the two polarized components is increased until the condition for accomplishing single mode transmission is no longer obtainable, and this occurs even if $\Delta\beta$, the difference between the two phase constants, is fairly large.

To eliminate these defects of the conventional "single mode" fiber, and for the purpose of providing an optical fiber that would theoretically be able to transmit only a single polarized, single mode, we previously invented an optical fiber that was made of a center core surrounded by a cladding having a lower refractive index than said core and which provided an even lower refractive index in two diametrically opposite portions of the core-cladding interface. We filed a patent application for this invention (Japanese Patent Application No. 102943/79) on Aug. 13, 1979. In this invention, we used a dielectric material having a relatively low dielectric constant in the selected two diametrically opposite portions of the core-cladding interface, but the specification of the invention contained no explicit reference to the degree by which the refractive index of these portions should be made smaller than that of the cladding.

SUMMARY OF THE INVENTION

In the present invention, we replaced the dielectric material by a tunnelling space extending in the axial direction of the fiber. According to our theoretical analysis of the characteristics of various single mode fiber geometries, the best single polarization characteristics could be obtained when the refractive index in that tunnelling space was brought close to 1.0 by filling it with air or any other suitable gas or even by creating a vacuum in that area. The present invention is based on this finding and presents an optical fiber with an improved structure having a tunnel extending through the core-cladding interface on both sides of the core, as well as two other modifications having an axially nonsymmetric geometry in refractive index distribution.

BRIEF DESCRIPTION OF THE DRAWINGS

Various embodiments of the optical fiber of the present invention are hereunder described in detail by reference to the accompanying figures, wherein.

PREFERRED EMBODIMENTS OF THE INVENTION

Figure 1A:
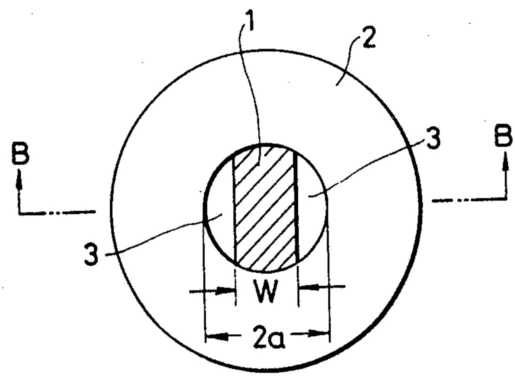
FIG. 1 illustrates one embodiment of the optical fiber described in Japanese Patent Application No. 102943/79 which is the starting point of the present invention.
Figure 1B:
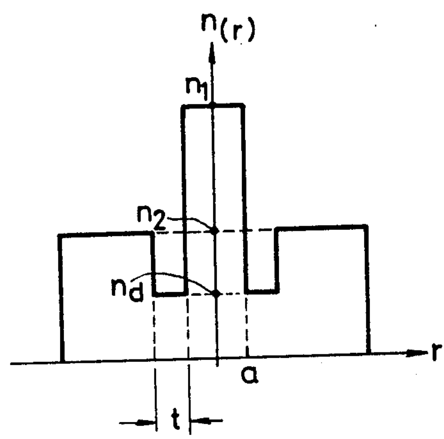

FIG. 1 illustrates one embodiment of the invention of Japanese Patent Application No. 102943/79 on the basis of which the present invention has been accomplished. FIG. 1(*a*) is a cross section of the optical fiber according to this embodiment, and FIG. 1(*b*) shows a distribution of refractive indices in the fiber as taken along the line B—B. In this embodiment, a center core 1 having a circular cross section with a refractive index $n_2$ is surrounded by a cladding 2 with a lower refractive index $n_2$ which has a second cladding 3 made of two diametrically opposite portions of the core/cladding interface and having an even lower refractive index $n_d$. It has been theoretically demonstrated that by holding $n_d$ (the refractive index of the second cladding) lower than a certain value, a frequency band that cuts off $HE_{11}^{(H)}$ mode and permits only $HE_{11}^{(V)}$ to propagate is produced on the frequency base (T. Okoshi and K. Oyamada, "Single-polarization Single-Mode Optical Fiber with Refractive Index Pits on Both Sides of Core", Electronics Letters, vol. 16, No. 18, pp. 712–713, Aug. 28, 1980).

Figure 2:
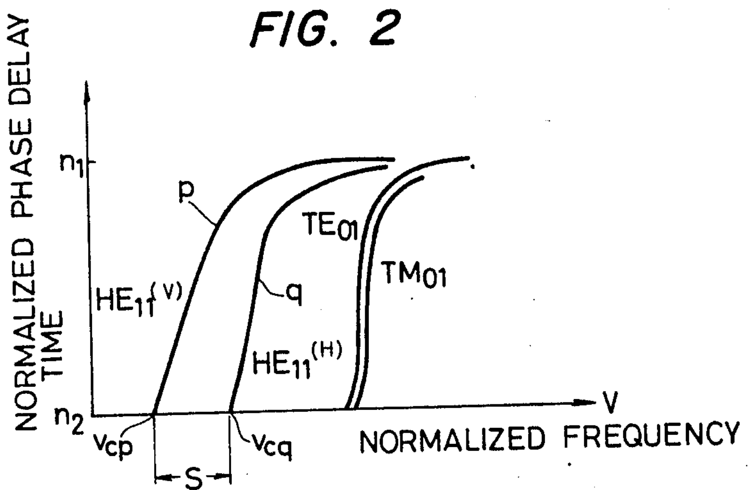
FIG. 2 is a graph showing the normalized phase delay time for $HE_{11}$, $TE_{01}$ and $TM_{01}$ modes as a function of normalized frequency V.

This observation is visually explained by the graph of FIG. 2 which gives the normlized phase delay time for $HE_{11}$, $TE_{01}$ and $TM_{01}$ modes as a function of normalized frequency V. The $HE_{11}^{(H)}$ mode having an electric field in horizontal direction in FIG. 1(*a*) is represented by curve (q) in FIG. 2, whereas $HE_{11}^{(V)}$ mode having an electric field in vertical direction is given by curve (p). These two curves provide a single-polarized, single-mode region (s) as shown in FIG. 2. A single-polarized, single-mode optical fiber can be produced by providing a design in which the normalized operating frequency is included within area (s). However, if a refractive index "pit" of the type shown in FIG. 1(*b*) is formed by doping quartz glass with an impurity such as boron, the relative width of area (s) represented by $K=(V_{cq}-V_{cp})/V_{cp}$, is unable to assume a very great value. Scientists have confirmed that K can assume a fairly large value if $W=2a\times0.3$ with a fiber cross section having the geometry shown in FIG. 1(*a*). Even in such a case, if the depth of the "pit" is about equal to the difference between the indices of core and cladding (i.e., $n_2-n_d=n_1-n_2$), K is only 0.25% if delta, the relative difference in refractive index between core and cladding, which is given by $(n_1-n_2)/n_1$ is 0.1%. Even for $\Delta=0.3\%$ and 1.0%, the respective values of K are 0.73% and 2.4%. Furthermore, the impurity incorporated for the purpose of providing the second cladding may increase the chance of greatly increased propagation loss.

Figure 3:
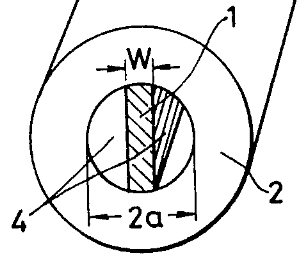
FIG. 3 is a perspective view of the optical fiber according to the first embodiment of the present invention.
Figure 4:
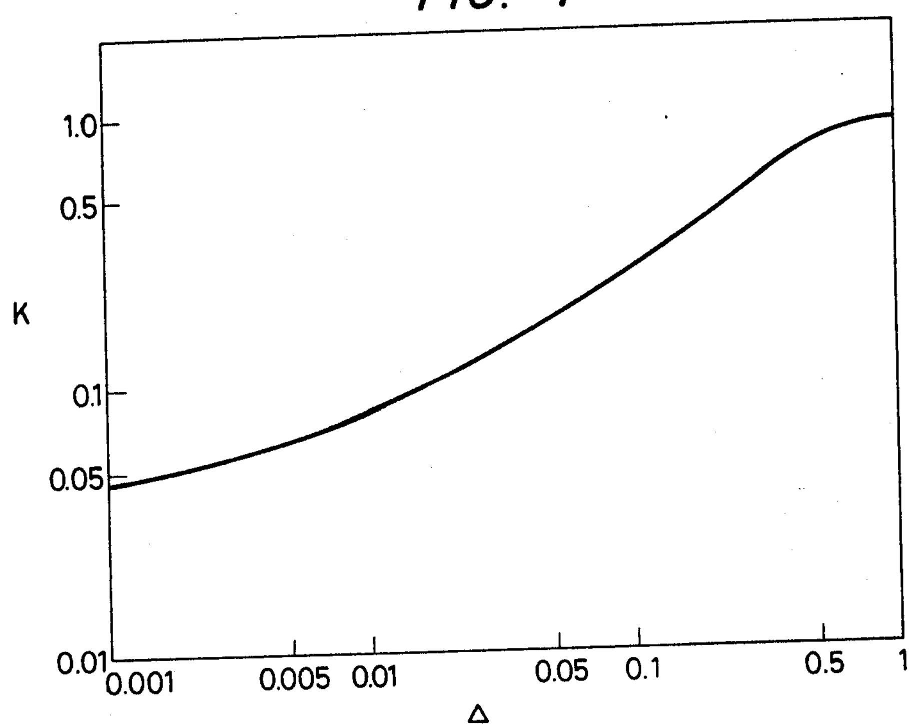
FIG. 4 is a graph showing the relation between the relative difference in refractive index between core and claling (Δ) and the relative frequency band of single polarization (K) for the optical fiber having the geometry shown in FIG. 3.

According to the first embodiment of the present invention, the area 3 on both sides of the core which is provided with a "pit" in refractive index in FIG. 1 is formed as a tunnel 4 that extends down through the fiber in its axial direction as shown in FIG. 3 and which is either filled with air or any other suitable gas or evacuated so as to bring the refractive index of that area close to 1.0. We made a computer analysis of the relation between delta and K or $W=2a\times0.3$, and the results are shown in FIG. 4. As is clear from this Figure, a single polarized band whose K is 4.6% can be produced if $\Delta=0.1\%$, and the K value is increased to 7.0% if $\Delta=1\%$. This is believed to greatly facilitate the design and manufacture of a single-polarized optical fiber that is adaptive to the oscillating frequency of a light source at the transmitting end.

As will be apparent from the above, the essence of the first embodiment of the present invention is to provide a single-polarized optical fiber with a tunnel extending along both sides of the core, and the fiber having this design exhibits good characteristics and can be manufactured fairly easily. A cross section of the optical fiber according to this embodiment is shown in FIG. 5(*a*). A modification of this embodiment is shown in FIG. 5(*b*), and we have confirmed that theoretically equally good characteristics are exhibited by this modified geometry.

The second embodiment of the present invention is shown in FIG. 5(*c*) wherein the two tunnels are connected by a space in slit form so as to split the core into two portions. This is essentially the same as the modification shown in FIG. 5(*b*) in that both achieve the propagation of light waves having a single-polarization area in their characteristics. A modification is shown in FIG. 5(*d*) wherein the slit separating the two tunnels in FIG. 5(*c*) is enlarged to provide a center cladding sandwiched by two core portions.

The third embodiment of the present invention is shown in FIG. 5(*e*) wherein the two cores are joined in the periphery of the tunnel so as to provide an area surrounding the tunnel. This is essentially the same as the embodiment of FIG. 5(*d*) in that both achieve the propagation of light waves having a single-polarization region in their characteristics. A modification of the third embodiment is shown in FIG. 5(*f*), wherein the core-cladding interface or tunnel-core interface has a different shape from that used in FIG. 5(*e*). This embodiment will certainly provide a single-polarization area so long as either one or both interfaces have an axially asymmetric geometry.

In the foregoing description, the present invention is taken as an optical fiber so designed as to provide a frequency region that enables the propagation of only a single polarized wave. However, we have confirmed by theoretical analysis that the design of the present invention has a very small coupling between $HE_{11}^{(V)}$ and $HE_{11}^{(H)}$ modes and hence has a good capability of retaining the desired polarization characteristics because $\Delta\beta$, which is the difference in phase constant between these two modes, is very great even in a frequency region higher than the cutoff frequency $V_{cq}$ (FIG. 2).

Figure 6:
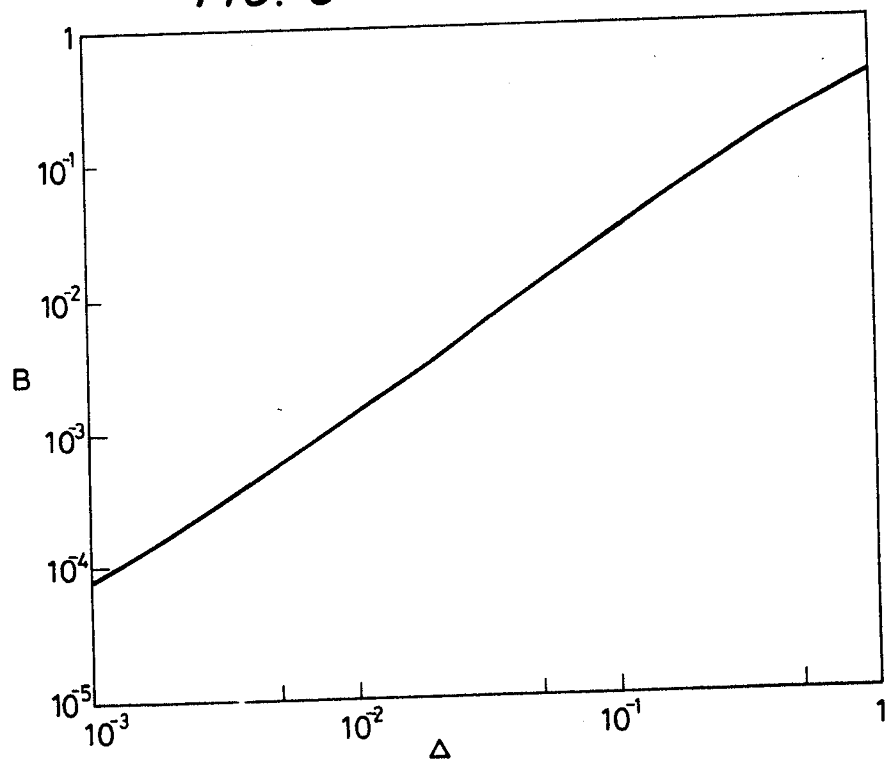
FIG. 6 is a graph showing the relation between delta and B which is the relative difference in phase constant between vertical and horizontal polarization modes.
Figure 5A:
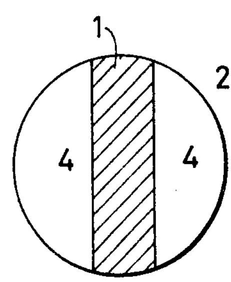
FIG. 5 shows two fiber geometries according to the first embodiment of the present invention [(a) and (b)] as compared with geometries according to the second embodiment [(c) and (d)] and the third embodiment [(e) and (f)]
Figure 5B:
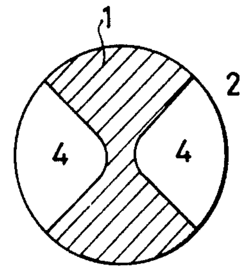
Figure 5C:
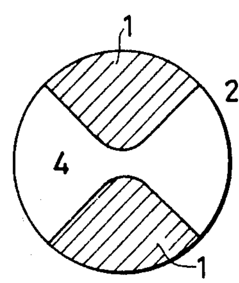
Figure 5D:
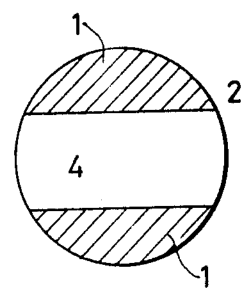
Figure 5E:
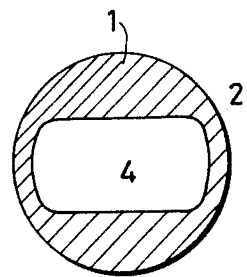
Figure 5F:
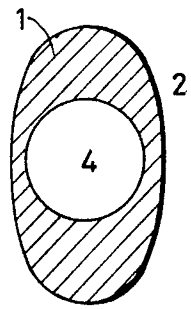

FIG. 6 shows in graphic form the results of our computer analysis of the relation between delta (the relative difference in refractive index between core and cladding) and the relative difference in phase constant between vertical and horizontal polarization modes ($B=\Delta\beta/\eta_{av.}$). As FIG. 6 clearly shows, when $\Delta=0.1\%$, 1% and 3%, $B=8\times10^{-5}$, $1.3\times10^{-3}$ and $6\times10^{-3}$. Each of these values of B is much greater than the maximum value ever reported ($B=5\times10^{-4}$).

What is claimed is:

1. An optical fiber having a central axis comprising a central core having a first refractive index positioned on said axis, a cladding having a second refractive index lower than said first refractive index surrounding said core, and tunnel means extending parallel to the axis of said fiber comprised of two portions disposed on opposite sides of said core between said core and said cladding.

2. An optical fiber having an elongated axis comprising a core having a first refractive index located on said axis, a cladding having a second refractive index lower than said first refractive index surrounding said core and tunnel means extending parallel to the axis of said fiber and dividing said core into two spaced apart portions.

3. An optical fiber having an elongated axis comprising a central core having a first refractive index disposed on said axis, a cladding having a second refractive index lower than said first refractive index surrounding said core, and tunnel means provided in said core parallel to said axis, said core, cladding and tunnel means defining interfaces which are asymmetric with respect to said axis of said fiber.

* * * * *